US009404012B2

(12) United States Patent
Connaughton, I et al.

(10) Patent No.: US 9,404,012 B2
(45) Date of Patent: Aug. 2, 2016

(54) ARTICLE COMPRISING A FLEXIBLE MATERIAL OF A NON-WOVEN, THE FLEXIBLE MATERIAL TREATED WITH POLYCARBOXY EMULSION COPOLYMER BINDER COMPOSITIONS

(71) Applicant: Rohm and Haas Company, Philadelphia, PA (US)

(72) Inventors: James T. Connaughton, I, Pipersville, PA (US); William C. Finch, Ambler, PA (US); Michael D. Kelly, North Wales, PA (US); Hal C. Morris, Abington, PA (US); Xun Tang, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 470 days.

(21) Appl. No.: 13/896,649

(22) Filed: May 17, 2013

(65) Prior Publication Data
US 2013/0251938 A1    Sep. 26, 2013

Related U.S. Application Data

(62) Division of application No. 12/316,163, filed on Dec. 10, 2008, now abandoned.

(60) Provisional application No. 61/007,396, filed on Dec. 12, 2007.

(51) Int. Cl.
| | | |
|---|---|---|
| *B32B 13/00* | (2006.01) | |
| *C09D 133/14* | (2006.01) | |
| *C08F 222/02* | (2006.01) | |
| *C08K 5/053* | (2006.01) | |
| *C08K 5/17* | (2006.01) | |
| *C08K 5/20* | (2006.01) | |
| *D06M 13/203* | (2006.01) | |
| *D06M 15/263* | (2006.01) | |
| *D04H 1/587* | (2012.01) | |
| *D04H 1/64* | (2012.01) | |

(52) U.S. Cl.
CPC ............ *C09D 133/14* (2013.01); *C08F 222/02* (2013.01); *C08K 5/053* (2013.01); *C08K 5/17* (2013.01); *C08K 5/20* (2013.01); *D04H 1/587* (2013.01); *D04H 1/64* (2013.01); *D06M 13/203* (2013.01); *D06M 15/263* (2013.01); *Y10T 428/23986* (2015.04); *Y10T 428/2933* (2015.01); *Y10T 428/31739* (2015.04); *Y10T 428/31786* (2015.04); *Y10T 428/31855* (2015.04); *Y10T 428/31971* (2015.04); *Y10T 442/60* (2015.04); *Y10T 442/652* (2015.04); *Y10T 442/699* (2015.04)

(58) Field of Classification Search
CPC .......... C08F 222/02; C08K 5/17; C08K 5/20; C08K 5/053; C08L 33/064; D04H 1/641; D06M 13/203; D06M 15/263
See application file for complete search history.

(56) References Cited

U.S. PATENT DOCUMENTS

| | | | |
|---|---|---|---|
| 4,076,917 | A | 2/1978 | Swift et al. |
| 5,214,101 | A | 5/1993 | Pettit, Jr. et al. |
| 5,661,213 | A | 8/1997 | Arkens et al. |
| 5,718,728 | A | 2/1998 | Arkens et al. |
| 6,114,464 | A | 9/2000 | Reck et al. |
| 6,299,936 | B1 | 10/2001 | Reck et al. |
| 7,829,611 | B2 * | 11/2010 | Kelly ................... C09D 133/08 524/15 |
| 2005/0214534 | A1 | 9/2005 | Adamo et al. |
| 2006/0029786 | A1 | 2/2006 | Wang et al. |
| 2007/0012414 | A1 | 1/2007 | Kajander et al. |
| 2007/0059513 | A1 | 3/2007 | Yu et al. |
| 2007/0148430 | A1 | 6/2007 | Agrawal |
| 2009/0124151 | A1 * | 5/2009 | Shoemake .................... 442/180 |
| 2009/0170978 | A1 | 7/2009 | Kelly |
| 2009/0252962 | A1 | 10/2009 | Michl et al. |

FOREIGN PATENT DOCUMENTS

| | | |
|---|---|---|
| DE | 19621573 A1 | 12/1997 |
| EP | 1510618 A1 | 3/2005 |
| EP | 1801278 A1 | 6/2007 |
| EP | 1982273 A2 | 2/2008 |
| WO | 2006063802 A2 | 6/2006 |

* cited by examiner

*Primary Examiner* — Alexa Neckel
*Assistant Examiner* — Marie Reddick
(74) *Attorney, Agent, or Firm* — Andrew Merriam

(57) ABSTRACT

The present invention provides flexible binder compositions comprising one or more polycarboxy emulsion copolymer has a measured Tg of 40° C. or less, such as from −45° C. to 25° C., and a polyol crosslinker. In one embodiment, the binder compositions comprising the polycarboxy emulsion copolymer can be used in making pultruded composites, such as sheets, for example, flexible gypsum board facing sheets, and flexible non-woven articles such as, for example, carpet backing.

8 Claims, No Drawings

ARTICLE COMPRISING A FLEXIBLE MATERIAL OF A NON-WOVEN, THE FLEXIBLE MATERIAL TREATED WITH POLYCARBOXY EMULSION COPOLYMER BINDER COMPOSITIONS

"This application is a Division of U.S. application Ser. No. 12/316,163, filed Dec. 10, 2008, now abandoned, which claims priority to and is based on U.S. Provisional Application 61/007,396, filed Dec. 12, 2007."

The present invention relates to flexible binder compositions useful for binding nonwoven fibers for a variety of applications and, in particular, to binder compositions of one or more polycarboxy emulsion copolymer and one or more polyol for use, for example, for bonding pultruded fibers and rovings.

Wallboard formed of a gypsum core sandwiched between facing layers is used in the construction of most modern buildings. In its various forms, the material is employed as a surface for walls and ceilings and the like, both interior and exterior. It is relatively easy and inexpensive to install, finish, and maintain, and in suitable forms, is relatively fire resistant. Gypsum wallboard and gypsum panels are traditionally manufactured by a continuous process. In this process, a gypsum slurry is first generated in a mechanical mixer by mixing at least one of anhydrous calcium sulfate ($CaSO_4$) and calcium sulfate hemihydrate ($CaSO_4 \cdot \frac{1}{2}H_2O$, also known as calcined gypsum), water, and other substances, which may include set accelerants, waterproofing agents, reinforcing minerals, glass fibers, and the like. The gypsum slurry is normally deposited on a continuously advancing, lower facing sheet. Various additives, e.g. cellulose and glass fibers, are often added to the slurry to strengthen the gypsum core once it is dry or set. Starch is frequently added to the slurry in order to improve the adhesion between the gypsum core and the facing. A continuously advancing upper facing sheet is laid over the gypsum and the edges of the upper and lower facing sheets are pasted to each other with a suitable adhesive. The facing sheets and gypsum slurry are passed between parallel upper and lower forming plates or rolls in order to generate an integrated and continuous flat strip of unset gypsum sandwiched between the sheets. Such a flat strip of unset gypsum is known as a facing or liner. The strip is conveyed over a series of continuous moving belts and rollers for a period of several minutes, during which time the core begins to hydrate back to gypsum ($CaSO_4 \cdot 2H_2O$). The process is conventionally termed "setting," since the rehydrated gypsum is relatively hard. Once the gypsum core has set sufficiently, the continuous strip is cut into shorter lengths or even individual boards or panels of prescribed length.

After the cutting step, the gypsum boards are fed into drying ovens or kilns so as to evaporate excess water. Inside the drying ovens, the boards are blown with hot drying air. After the dried gypsum boards are removed from the ovens, the ends of the boards are trimmed off and the boards are cut to desired sizes. The boards are commonly sold to the building industry in the form of sheets nominally 4 feet wide and 8 to 12 feet or more long and in thicknesses from nominally about ¼ to 1 inches, the width and length dimensions defining the two faces of the board.

In some cases, manufacturers of the gypsum boards use paper, such as kraft paper to form the gypsum board facing sheets. While paper is desirable due to its low cost, there are some disadvantages associated with its use. For example, many applications demand water resistance that paper facing cannot provide. Upon exposure to water either directly in liquid form or indirectly through exposure to high humidity, paper is highly prone to degradation, such as by delamination, that substantially compromises its mechanical strength. Further, gypsum products typically rely on the integrity of the facing as a major contributor to their structural strength. Consequently, paper-faced products are generally not suited for exterior or other building uses in which exposure to moisture conditions is presumed. In addition, growing attention is being given to the issue of mold and mildew growth in building interiors and the potential adverse health impact such activity might have on building occupants. The paper facing of gypsum board contains wood pulp and other organic materials that may act in the presence of moisture or high humidity as nutrients for such microbial growth. Additionally, paper-faced gypsum board lacks flame resistance. In a building fire, the exposed paper facing quickly burns away. Although the gypsum itself is not flammable, once the facing is gone the board's mechanical strength is greatly impaired. At some stage thereafter the board is highly likely to collapse, permitting fire to spread to the underlying framing members and adjacent areas of a building, with obvious and serious consequences. A board having a facing less susceptible to burning would at least survive longer in a fire and thus be highly desirable in protecting both people and property.

In light of the disadvantages associated with using paper facing sheets, other types of material are often used as the facing sheets. One such material is a non-woven mat made for example from fibrous material such as a glass, mineral wool or polyester. Oftentimes, the mat is made of non-woven glass fibers randomly oriented and secured together with a binder. These glass mats, when used as facings, provide increased dimensional stability in the presence of moisture, biological resistance, and greater physical and mechanical properties than normal paper faced gypsum boards. The problems associated with the surface roughness of the boards may be decreased by applying a continuous coating. Typical coating compositions are well known in the art (see, for example U.S. Patent Publication No. 2005/0233657). A disadvantage associated with conventional binders for nonwoven fibers is that they are typically formaldehyde based binders.

U.S. Pat. No. 6,299,936, to Reck et al., discloses a thermally curable aqueous composition comprising: (A) at least one polymer, obtained by free-radical polymerization, which comprises ≤5% by weight of an α,β-ethylenically unsaturated mono- or dicarboxylic acid, in copolymerized form; (B) at least one polymer, obtained by free-radical polymerization, which comprises ≥15% by weight of an α,β-ethylenically unsaturated mono- or dicarboxylic acid, in copolymerized form; and (C) at least one alkanolamine having at least two hydroxyalkyl groups. Reck fails to provide compositions without the need for polymer A), a polymer that can be destabilized when the pH of the composition is changed to make it more acidic or basic, for example, by adding a more acidic polymer B).

There remains a need for binders that address the above-mentioned disadvantages associated with conventional facing sheets. The present invention seeks to solve the problem of providing stable binder compositions that enable the provision of formaldehyde free, water resistant articles containing nonwoven fibers that have at least one of the dry strength, wet strength, and hot/dry strength required for handling, cutting, and installation of the gypsum board and/or for the performance of other articles containing nonwoven fibers.

The present provides binder compositions comprising: (a) at least one polycarboxy emulsion copolymer polymerized from 10% to 25% by weight of a carboxy acid monomer, based on the total weight of monomers in the copolymer, wherein said copolymer has a measured glass transition temperature (measured Tg) of from 40° C. to 70° C., and a total weight solids of no less than 40%; and (b) at least one polyol crosslinker having a molecular weight of less than 700, wherein said polyol crosslinker comprises a primary hydroxy group and at least one additional hydroxy group, wherein the ratio of primary hydroxy group equivalents to carboxy group equivalents is from 0.25 to 2.0. In a product embodiment, the products of the present invention comprise nonwoven fibers treated with the binder compositions of the present invention, for example, gypsum board facing sheets.

In a separate embodiment, the present provides flexible and tear resistant binder compositions comprising (a) one or more polycarboxy emulsion copolymer polymerized from 10 wt. % to 25 wt. % of a carboxy acid monomer, based on the total weight of monomers in the copolymer, wherein said copolymer has a measured Tg of up to 40° C., for example, from −45° C. to 25° C., preferably, 0° C. to 25° C., or, more preferably, 5° C. or more, for flexible binder compositions with greater tensile strength, and a total solids of no less than 40 wt. %; and (b) at least one polyol crosslinker having a molecular weight of less than 700, wherein said polyol crosslinker comprises a primary hydroxy group and at least one additional hydroxy group, wherein the ratio of primary hydroxy group equivalents to carboxy group equivalents is from 0.25 to 2.0. The polycarboxy emulsion copolymer in flexible binder compositions with greater tensile strength preferably comprises a pre-crosslinked copolymer for solvent resistance. In one embodiment, the binder compositions consist essentially of the polycarboxy emulsion copolymer and the polyol, wherein the compositions do not include any (co)polymer containing less than 10% by weight, preferably less than 6% by weight, of a carboxy acid monomer, as those (co)polymers can be unstable to changes in pH.

A process of making the flexible non-woven fiber articles of the present invention comprises pultruding two or more non-woven fibers or a fiber roving with the flexible and tear resistant binder compositions, preferably flexible binder compositions with greater tensile strength, and drying, optionally with heating. In a product embodiment, the products of the present invention comprise flexible non-woven fiber articles, e.g. pultruded fibers for flexible gypsum board facing sheets or portions thereof, treated with the flexible binder compositions of the present invention, preferably, flexible binder compositions with greater tensile strength.

In another product embodiment, the products of the present invention comprise non-woven fiber mats, e.g. for carpet backing treated with flexible binder compositions of the present invention having a measured Tg of from −45° C. to −5° C.

All ranges recited are inclusive and combinable. For example, a proportion of one or more carboxy acid monomer in a polycarboxy emulsion copolymer of 10 wt. % to 25 wt. %, preferably 12 wt. % or more, or, 14 wt. % or more, or, 17 wt. % or less, or, 20 wt. % or less, based on the weight of the emulsion copolymer solids, will include ranges of 12 wt. % to 25 wt. %, from 14 wt. % to 25 wt. %, from 17 wt. % to 25 wt. %, from 20 wt. % to 25 wt. %, from 12 wt. % to 14 wt. %, from 12 wt. % to 17 wt. %, from 12 wt. % to 20 wt. %, from 14 wt. % to 17 wt. %, from 14 wt. % to 20 wt. %, from 14 wt. % to 25 wt. %, from 17 wt. % to 20 wt. %, from 17 wt. % to 25 wt. % and from 20 wt. % to 25 wt. %.

Unless otherwise indicated, all pressure units are standard pressure and all temperature units refer to room temperature.

All phrases comprising parenthesis denote either or both of the included parenthetical matter and its absence. For example, the phrase "(co)polymer" includes, in the alternative, polymer, copolymer and mixtures thereof. Also, the term "(meth)acrylate" means acrylate, methacrylate, and mixtures thereof and the term "(meth)acrylic" used herein means acrylic, methacrylic, and mixtures thereof.

As used herein, the term "acrylic polymer" refers to polymers comprising the polymerization product of acrylate and/or methacrylate monomers.

As used herein, the phrase "aqueous" includes water and mixtures comprising water and one or more water-miscible solvent.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" or "aqueous solvent" includes water and mixtures composed substantially of water and water-miscible solvents.

As used herein, the phrase "based on the total weight of binder solids" refers to weight amounts of any given ingredient in comparison to the total weight amount of all the non-water ingredients in the binder (e.g., polyacids, emulsion copolymers, polyols and the like). Binders of this invention can be aqueous or dry (with water optionally added prior to application to a substrate).

As used herein, unless otherwise indicated, the word "copolymer" includes, independently, copolymers, terpolymers, block copolymers, segmented copolymers, graft copolymers, and any mixture or combination thereof. (Co)polymer means homopolymer or copolymer.

As used herein, the phrases "$(C_3-C_{12})$—" or "$(C_3-C_6)$—" and the like refer to organic compounds or structural portions of organic compounds containing 3 to 12 carbon atoms and 3 to 6 carbon atoms, respectively.

As used herein, the term "measured Tg" refers to the glass transition temperature of a sample (co)polymer as measured by differential scanning calorimetry per ASTM 3418/82 (1982), midpoint temperature; cell calibration using an indium reference for temperature and enthalpy.

As used herein, unless otherwise indicated, the phrase "molecular weight" or "average molecular weight" refers to the weight average molecular weight of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

The present invention enables one to provide binder compositions for a variety of uses with a single polycarboxy emulsion copolymer and, thus, eliminate the need for a copolymer having less than 5 wt. % copolymerized acid that comprises a hydrophobic phase and which could therefore become unstable in aqueous compositions, e.g. as pH varies in the processing and use of an emulsion, dispersion or suspension polymer.

The binder compositions of the present invention contain at least one polycarboxy emulsion copolymer and at least one polyol crosslinker. The polycarboxy emulsion copolymer includes, as copolymerized units from 10 wt. % to 25 wt. %, preferably from 12 wt. % to 20 wt. %, most preferably 14 wt. % to 17 wt. %, based on the weight of the emulsion copolymer solids, of one or more carboxy acid monomer bearing a carboxylic acid group, anhydride group or salt thereof. The preferred ranges of carboxy acid monomers insure that the binder compositions cure to an adequate crosslinking density and enable the development of early cure strength Suitable carboxy monomers include, for example, ethylenically unsaturated carboxylic acid monomers such as, for example, methacrylic acid, acrylic acid, crotonic acid, fumaric acid, maleic acid, 2-methyl maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. In a preferred embodiment of the invention, the carboxy monomer may be acrylic acid or methacrylic acid.

In the polycarboxy emulsion copolymer, the one or more carboxy acid monomer may be copolymerized with any suitable monomer to provide product copolymers having the desired measured Tg. In one embodiment of the invention, the carboxy acid is copolymerized with at least one ethylenically unsaturated monomer, such as an acrylic ester monomer. Suitable acrylic ester monomers include, for example, methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; (meth)acrylamide or substituted (meth)acrylamides; styrene or substituted styrenes; butadiene; vinyl acetate or other vinyl esters; acrylonitrile or methacrylonitrile; and the like. Monomers that give a polymer of high measured Tg may include, for example, styrene or substituted styrenes, ethyl methacrylate and methyl methacrylate; monomers that give a copolymer of low measured Tg may include, for example, ethyl acrylate, butyl acrylate, 2-ethylhexyl acrylate, decyl (meth)acrylate, and butyl methacrylate.

The polycarboxy emulsion copolymer may have a measured Tg of from 40° C. to 70° C., preferably from 45° C. to 65° C., more preferably from 50° C. to 60° C., where the Tg is as measured by differential scanning calorimetry per ASTM 3418/82, midpoint temperature; cell calibration using an indium reference for temperature and enthalpy. Such polycarboxy emulsion copolymers enable one to provide strong binders for gypsum board facing sheets.

In another embodiment, the polycarboxy emulsion copolymer is suitable for use in flexible binder compositions with greater tensile strength and has a measured Tg of from 0° C. to 25° C., or, preferably, 5° C. or more, where the Tg is as measured by differential scanning calorimetry per ASTM 3418/82, midpoint temperature; cell calibration using an indium reference for temperature and enthalpy.

In yet another embodiment, the polycarboxy emulsion copolymer is flexible and has a measured Tg of from −45° C. to −5° C., where the Tg is as measured by differential scanning calorimetry per ASTM 3418/82, midpoint temperature; cell calibration using an indium reference for temperature and enthalpy. Such polycarboxy emulsion copolymers provide binder compositions for carpet backing.

The polycarboxy emulsion copolymer of the present invention has a total weight solids of no less than 40% preferably from 40% to 60%, or, more preferably from 45% to 55%.

In one embodiment of the invention, the emulsion copolymer has a weight average molecular weight of from 5,000 to 1,000,000, preferably from 20,000 to 750,000, or, more preferably, 30,000 or more, or, most preferably 60,000 or more and up to 600,000.

In another embodiment of the invention, the emulsion copolymer particles may have a particle size of from 50 to 300 nm, preferably from 75 to 225 nm, more preferably from 125 to 175 nm.

The polycarboxy emulsion copolymer may be made by any conventional emulsion polymerization, which emulsion processes are well known by those of ordinary skill in the art.

During the emulsion polymerization process, chain transfer agents such as mercaptans, polymercaptans, and halogen compounds may be used in the polymerization mixture in order to moderate the molecular weight of the copolymer composition. Generally, from 0% to 10% by weight, based on the weight of the polymeric binder, of $C_4$-$C_{20}$ alkyl mercaptans, mercaptopropionic acid, or esters of mercaptopropionic acid, can be used.

Low levels of multi-ethylenically-unsaturated monomers can be used in order to produce low levels of pre-crosslinking, such as, for example, allyl methacrylate, diallyl phthalate, 1,4-butylene glycol dimethacrylate, 1,6-hexanedioldiacrylate, and the like. In those embodiments of the invention where the multi-ethylenically-unsaturated monomers are used, it is preferred that they be used as a level of from 0.01% to 5%, by weight based on the weight of copolymer. In a preferred embodiment, flexible binder compositions with greater tensile strength comprise pre-crosslinked polycarboxy emulsion copolymers having a measured Tg of from −45° C. to 25° C., preferably, 5° C. or more.

The binder of the invention further contains at least one polyol crosslinker. By "polyol" is meant herein, a compound containing at least two hydroxyl groups. In the binder of this invention, the ratio of primary hydroxyl group equivalents (contributed by the polyol) to carboxy (—COOH) group equivalents (contributed by the emulsion copolymer, the soluble copolymer and the polybasic carboxylic acid) is from 0.25 to 2.0, preferably from 0.4 to 1.75, more preferably from 0.5 to 1.6. In those embodiments of the invention where the polyol is triethanolamine, it is preferred that the hydroxy to carboxy equivalents ratio is from 0.25 to 1.0, more preferably from 0.4 to 0.85, and even more preferably from 0.5 to 0.7. In those embodiments of the invention where the polyol is glycerol, it is preferred that the hydroxy to carboxy equivalents ratio is from 1.0 to 2.0, more preferably from 1.25 to 1.75, and even more preferably from 1.4 to 1.6, where the glycerol has two active hydroxyl groups.

The polyol crosslinker has a molecular weight of less than 700, preferably less than 500, and more preferably less than 250.

Examples of suitable polyols include, for example triethanolamine, a hydroxyamide group-containing polyol, glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis-[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl (meth)acrylate, hydroxypropyl (meth)acrylate, and the like. In a preferred embodiment of the invention, the polyol is triethanolamine or glycerol.

Useful hydroxyamides for this invention include those described in Swift U.S. Pat. No. 4,076,917, and Arkens EP Patent No. 0,512,732. In those embodiments of the invention where the polyol is a hydroxamide, it is preferred that it is a reactive β-hydroxyamide group-containing polyol of the following formula (I), which is the reaction product of a lactone or other cyclic ester and an alkanolamine:

(I)

in which formula, R and R" independently represent H, or any monovalent $C_1$ to $C_{18}$ linear or branched alkyl, which alkyl may comprise one or two aryl or cycloalkyl groups, or be substituted with one or more hydroxyl, amine, thiol, amide, carboxyl or alkenyl groups, or combinations thereof; R' represents either a covalent bond or a divalent $C_1$ to $C_5$ alkylene radical where the alkylene radical may bear alkyl group substituents; y is the integer 1 or 2; x is 0 or 1, such that (x+y)=2;

The reactive β- hydroxyamide group-containing polyol may be the reaction product of one or more alkanolamine with one or more lactone or lactide. Suitable alkanolamines include for example mono- or di-ethanolamines, as well as any $C_1$ to $C_{18}$ linear or branched α-alk(en)yl substituted mono- or di-ethanolamines, wherein the alk(en)yl substituent may contain aryl, cycloalkyl and alkenyl groups. Examples of substituted alkanolamines include for example mono- or di-isopropanolamines and other mono-(1-alk(en)yl)ethanol amine or di-(1-alk(en)yl)ethanol amine. Suitable lactones include for example lactides, glycolides, and lactones of any $C_2$ to $C_8$ hydroxycarboxylic acids, as well as dimers and oligomers thereof. Preferred lactones include for example any comprising 5 to 7 membered rings, such as ε-caprolactone, γ-butyrolactone and any α-$C_1$ to $C_{18}$ alk(en)yl mono-substituted forms thereof, such as α-methyl -ε-caprolactone or α-methyl-γ- butyrolactone.

The reactive β-hydroxyamide group containing polyol (I) may be produced by simple mixing of the lactone and alkanolamine reactants, and, if needed, heating, such as when reacting dimers or oligomers of lactones. Preferably, the reactive β-hydroxyamide group containing polyol(s) (I) are produced in a "dry" or anhydrous mixture of the reactants.

Desirable β- hydroxyamide polyols can be produced by reaction of lactones or lactides with alkanolamines. Specific, non-limiting, examples of this reaction are the reaction of either caprolactone or butyrolactone with diethanolamine to form their corresponding β- hydroxyamide products. No highly volatile organic by-products are formed by this reaction. Potential by-products, including the acid generated by hydrolysis of the lactone, if non-anhydrous conditions are used, and un-reacted diethanolamine, can cure into the thermoset network. Accordingly, the curable compositions of the present invention resist exuding from substrates treated with them.

The hydroxyamide is preferably present in an amount of 1%-30% by weight of the total solids in the binder, more preferably 5%-15%.

In one embodiment of the invention, the polycarboxy emulsion copolymer is not blended with any other polymers. In another embodiment of the invention, the binder composition does not include any polymers containing less than 10% by weight, preferably less than 6% by weight, of a carboxy acid monomer. Such embodiments are preferred to provide binder compositions with a desired crosslinking density, and that develop early cure strength.

The binder compositions of the present invention can optionally include a soluble addition (co)polymer, containing at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid; ethylenically unsaturated anhydrides such as, for example, maleic anhydride, itaconic anhydride, acrylic anhydride, and methacrylic anhydride; and salts thereof, at a level of at least 70% by weight based on the weight of the addition (co)polymer, may be used. Additional ethylenically unsaturated monomers may include acrylic ester monomers, including methyl (meth)acrylate, ethyl (meth)acrylate, butyl (meth)acrylate, 2-ethylhexyl acrylate, and the like.

The soluble addition (co)polymer containing at least two carboxylic acid groups, anhydride groups, or salts thereof may have a molecular weight from about 1,000 to 150,000.

The soluble addition (co)polymer containing at least two carboxylic acid groups, anhydride groups, or salts thereof may be used at a level from 0%-30% by weight based on the total weight of the polycarboxy emulsion copolymer.

In one embodiment of the invention, the binder compositions further contain at least one low molecular weight polybasic carboxylic acid, anhydride or salt thereof having a molecular weight of 1000 or less, preferably 500 or less, and most preferably 200 or less. "Polybasic" means having at least two reactive acid or anhydride functional groups. Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Preferably, the low molecular weight polybasic carboxylic acid, anhydride or salt thereof is pre-cooked, under reactive conditions, with the polysaccharide or vegetable protein, prior to mixing with the polycarboxy emulsion copolymer. Most preferably, citric acid is used as the polybasic acid, and hydroxyethylated corn starch is used as the polysaccharide.

In a preferred embodiment of the invention, the binder compositions are formaldehyde-free. By "formaldehyde free" is meant herein substantially free from added formaldehyde, and not liberating substantial formaldehyde as a result of drying and/or curing. To minimize the formaldehyde content of the aqueous composition, it is preferred, when preparing the polycarboxy emulsion copolymer, to use polymerization adjuncts and additives such as, for example, initiators, reducing agents, chain transfer agents, curing agents, biocides, surfactants, emulsifiers coupling agents, anti-foaming agents, dust suppressing agents, fillers and the like, which are themselves free from formaldehyde, do not generate formaldehyde during the polymerization process, and do not generate or emit formaldehyde during the treatment of heat-resistant nonwovens.

In one embodiment of this invention, the binder composition further contains a phosphorous-containing accelerator such as those disclosed in U.S. Pat. No. 6,136,916. The phosphorous-containing accelerator may be a polymer bearing phosphorous-containing groups such as, for example, an acrylate polymer formed in the presence of sodium hypophosphite by addition polymerization, but a separate compound from any soluble polymer that may serve as part of the binder composition of the present invention. In a preferred embodiment of the invention, the accelerator may be sodium hypophosphite, sodium phosphite, or a mixture thereof, with sodium phosphate being preferred, at a weight percent, based on total carboxyl acid weight from the emulsion polymer and the soluble polymer (if it is used), of from 1% to 20%, preferably from 5% to 15%. The one or more phosphorous-containing accelerator may be used at a level of from 0 wt. % to 40 wt. %, preferably up to 25 wt. %, more preferably up to 20 wt. %, even more preferably up to 15 wt. %, or still more preferably up to 12 wt. %, based on the total weight of binder solids. The phosphorous-containing accelerators may be used in the amount of 0.1 wt. % or more, based on the total weight of binder solids.

In another embodiment, the binder composition may contain one or more strong acids, wherein the strong acid has a pKa of ≤3.0. The binder composition may contain up to 0.2 equivalents of a strong acid, relative to the equivalents of total carboxylic acid from the emulsion polymer and the optional soluble polymer, such as from 0.01 to 0.18 equivalents. The strong acid may be a mineral acid, such as, for example, sulfuric acid, or an organic acid, such as, for example, a sulfonic acid. Mineral acids are preferred.

In drying (if applied in aqueous form) and curing the binder composition, the duration, and temperature of heating will affect the rate of drying, ease of processing or handling, and property development of the article bearing the binder. Suitable heat treatment at 100° C. or more, and up to 400° C., may be maintained for from 3 seconds to 15 minutes. Preferably, heat treatment temperatures range from 150° C. or higher; more preferably from 150° C. to 225° C., even more preferably from 150° C. to 200° C. In those embodiments of the invention where a phosphorous-containing accelerator is used, heat treatment temperatures of up to 150° C. are preferred. Where the substrate upon which the binder composition is applied contains wood, temperatures of 100° C. to 220° C., are preferred.

In one embodiment of the invention, drying and curing of the binder composition may be performed in two or more distinct steps, if desired. For example, the binder composition can be first heated at temperatures and for times sufficient to substantially dry, but not to substantially cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

The binder compositions of the present invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones—OSi Specialties, located in Wilton Conn.); polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

The binder compositions are suitable for binding non-woven fibers, such as, for example, glass fibers, polyester fibers, rayon fibers, nylon fibers, superabsorbent fibers, renewable fibers, such as plant fibers like flax, sisal, hemp or jute, and the like, thereby forming a nonwoven web or fabric. The binder compositions of the present invention are useful to bind non-woven fibers, which fibers may be formed in a non-woven article, such as a non-woven web.

"Non-woven web" refers to any article or sheet-like form made from natural and/or synthetic fibers wherein the fibers are aligned in a random or semi-random order (i.e., not deliberately ordered). One skilled in the art understands that formation of some order occurs during the web forming process (primarily in the machine direction); however, this is completely different from the ordering obtained from traditional weaving or knitting processes. Suitable fibers for use in forming non-woven webs include, but are not limited to, fiberglass, cellulose, modified cellulose (cellulose acetate), cotton, polyesters, rayon, polyacrylonitrile (PAN), polylactic acid (PLA), polycaprolactone (PCL), polyolefins and bi-component fiber comprising two or more fiber-forming polymers such as polypropylene and polyethylene terphthalate and the like. Included in the definition of non-woven webs suitable for use with this invention are porous films prepared by the action of chemical or mechanical processing (e.g., apertured films). The present invention will find utility with any weight of non-woven web and will depend greatly on the requirements of the particular application.

Manufacturing processes for making non-woven webs are well known in the art. These include, for example, wet-laid, air-laid (dry laid), spunbond, spunlace, meltblown and needle punch. The webs may have any base weight (i.e., the weight of the web before any coating or treatments are applied) suitable for their intended use. In one embodiment of the invention, the web has a base weight of less than 100 grams per square meter (gsm). In a different embodiment of the invention, the web will have a base weight of less than about 20 gsm.

Additionally, the present invention provides non-woven articles, such as non-woven mats, containing nonwoven fibers that have been bound by the binder composition of the invention.

The fibers may be employed in many forms, including individual fibers, strands containing plural fibers, and rovings. For example, glass fibers may be formed by drawing molten glass into filaments through a bushing or orifice plate and applying an aqueous sizing composition, such as one containing lubricants, coupling agents, and film-forming binder resins to the filaments. The sizing composition provides protection to the fibers from interfilament abrasion and promotes compatibility between the glass fibers and the matrix in which the glass fibers are to be used. After the sizing composition is applied, the wet fibers may be gathered into one or more strands, chopped, and collected as wet chopped fiber strands.

In one embodiment of the invention, nonwoven mats may be made by forming a web of wet or dry nonwoven fibers, and transferring the web to a moving screen running through a binder application station where the binder composition of the invention may be applied to the web. The binder may be applied to the web by any suitable means including, for example, air or airless spraying, padding, saturating, roll coating, curtain coating, beater deposition, coagulation or dip and squeeze application. The resultant saturated wet bindered web laying on a supporting wire or screen may be run over one or more vacuum boxes to remove enough binder to achieve the desired binder content in the mat.

In a different embodiment of the invention, nonwoven mats may be formed by a wet-laid process, whereby wet chopped glass fibers may be deposited onto a conveyor from a fiber feed system. The chopped glass fibers may be placed into a pulper or mixing tank that contains various surfactants, viscosity modifiers, defoaming agents, and/or other chemical agents with agitation to form a chopped glass fiber slurry. The conglomeration of chemicals in the mixing tank is commonly termed "white water". The glass fiber slurry may be passed through a machine chest and a constant level chest to further disperse the fibers in the whitewater. The chopped glass slurry may then be transferred from the constant level chest, and pumped via a fan pump to a head box. The glass fiber slurry may then deposited onto a moving screen or wire where a substantial portion of the water from the slurry may be removed via gravity through head pressure within the headbox to form a web. Excess whitewater may be removed and deposited into a silo. Whitewater may be further removed from the web by a conventional vacuum or air suction system. The binder composition may then be applied to the web by a binder applicator such as, for example, a curtain coater. Excess binder may be vacuumed from the web by a vacuum or air suction apparatus, and deposited into a binder supply tank.

In yet another embodiment of the present invention, nonwoven fiber articles may comprise pultruded materials or composites that have been treated with flexible binder compositions with greater tensile strength during pultrusion. Pultrusion may be any process that combines extruding in any shape two or more fibers, one or more fiber roving, or any combination thereof, with pulling the fibers and/or roving(s) through one or more binder composition treatment stage and one or more heating or drying stage to cure the binder composition. The pultruded materials are preferably treated with flexible and tear resistant binder compositions according to the present invention, such as those flexible binder compositions with greater tensile strength, more preferably with binder compositions comprising one or more pre-crosslinked polycarboxy emulsion copolymer.

Products of the present invention comprising pultruded materials may take any known form, such as, for example, tubes, rods, e.g. poles, pipes, beams, panels, plates, sheets and laminates. Example of pultruded materials include, for example, a flexible gypsum board facing sheet that can be wound or bent around the edge(s) of the gypsum board, and any product that can be made by a non-woven fiber composite, e.g. roof gutters, roof trim, tool shafts, housings for electronics, cell phones and appliances, and automotive trim and paneling.

In any process of the present invention, the binder level in the non-woven fiber articles may vary, depending upon the application for which the article, such as a nonwoven mat, is intended. After application to the nonwoven article, the binder composition may be cured by the application of heat.

After the binder has been cured, it may be coated with a suitable composition to deliver a specific desired additive or to obtain specific desired properties such as better touch, smoothness or strength. Suitable coatings are well known in the art.

EXAMPLES

These examples illustrate specific binder compositions of this invention and ones that compare to such compositions.

Example 1 and Example 2

Emulsion Copolymer Synthesis

Example 1

A 5-liter round-bottom flask equipped with a paddle stirrer, thermocouple, nitrogen inlet, and reflux condenser was charged with 876.4 grams of deionized water, 24.2 grams of sodium hypophosphite monohydrate, 28.5 grams of a sodium lauryl ether sulfate surfactant solution (30%), 3.1 grams of sodium hydroxide, and 0.058 grams of an inhibitor. The mixture was heated to 79° C.

A monomer emulsion was prepared using 459.7 grams of deionized water, 89.2 grams of a sodium lauryl ether sulfate surfactant solution (30%), 553.9 grams of butyl acrylate, 969.7 grams of styrene, and 268.9 grams of acrylic acid. A 97.0 gram aliquot of this monomer emulsion was added to the reaction flask, followed by a solution of 7.4 grams of ammonium persulfate dissolved in 33.3 grams of deionized water. After an exotherm and while maintaining a reaction temperature of 86° C., the monomer emulsion and a separate solution of 7.4 grams of ammonium persulfate in 156.9 grams of deionized water were gradually added over a total time of 130 minutes. After these additions were complete a solution of 42.6 grams of sodium hydroxide dissolved in 397.4 grams deionized water was added. A solution of 0.022 grams of ferrous sulfate heptahydrate in 4.8 grams deionized water and a solution of 0.022 grams of ethylene diamine tetraacetate, tetra sodium salt dissolved in 4.8 grams of deionized water was added to the reaction mixture. A solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After a brief hold, a solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After addition of these solutions was complete, 47.6 grams of deionized water was added, and the reaction mixture was cooled to room temperature. When the reaction mixture was cool, a biocide was added and the latex was filtered.

The resulting latex had a solids content of roughly 46.0%. As shown in Table A, the copolymer emulsion of Example 1 had a Tg of 55° C.

Example 2

A 5-gallon stainless steal reactor equipped with a stirrer, thermocouple, nitrogen inlet, and reflux condenser was charged with 3221.7 grams of deionized water, 109.1 grams of sodium hypophosphite monohydrate, 128.4 grams of a sodium lauryl ether sulfate surfactant solution (30%), 13.9 grams of sodium hydroxide, and 0.26 grams of an inhibitor. The mixture was heated to 79° C.

A monomer emulsion was prepared using 2257.7 grams of deionized water, 401.5 grams of a sodium lauryl ether sulfate surfactant solution (30%), 4220.3 grams of butyl acrylate, 2638.7 grams of styrene, and 1210.4 grams of acrylic acid. A 443.1 gram aliquot of this monomer emulsion was added to the reaction flask, followed by a solution of 33.2 grams of ammonium persulfate dissolved in 167.6 grams of deionized water. After an exotherm and while maintaining a reaction temperature of 86° C., the monomer emulsion and a separate solution of 33.2 grams of ammonium persulfate in 707.4 grams of deionized water were gradually added over a total time of 130 minutes. After these additions were complete a solution of 192.6 grams of sodium hydroxide dissolved in 2164.7 grams deionized water was added. A solution of 0.097 grams of ferrous sulfate heptahydrate in 32.4 grams deionized water and a solution of 0.098 grams of ethylene diamine tetraacetate, tetra sodium salt dissolved in 32.4 grams of deionized water was added to the reaction mixture. A solution of 35.6 grams of aqueous tert-butylhydroperoxide (70%) diluted with 158.8 grams deionized water and a solution of 23.7 grams of sodium bisulfite dissolved in 301.0 grams of deionized water were gradually added to the reaction mixture. After a brief hold, a solution of 35.6 grams of aqueous tert-butylhydroperoxide (70%) diluted with 158.8 grams deionized water and a solution of 23.7 grams of sodium bisulfite dissolved in 301.0 grams of deionized water were gradually added to the reaction mixture. After addition of these solutions was complete, 109.9 grams of deionized water was added, and the reaction mixture was cooled to room temperature. When the reaction mixture was cool, a biocide was added and the latex was filtered.

The resulting latex had a solids content of roughly 44.7%. As shown in Table A, the copolymer emulsion of Comparative Example 2 had a Tg of 15° C.

Examples 3 and 4

The polycarboxy emulsion copolymer of Examples 3 and 4 were prepared in the same way as the emulsion copolymer in Example 1, with the exception that:

In Example 3, the polycarboxy emulsion copolymer comprised the polymerization product of 52.3 wt. % butyl acrylate (BA) with 32.7 wt. % of Styrene (Sty) and 15 wt. % of acrylic acid AA and had a solids content of 45.0 wt. %; and, In Example 4, the polycarboxy emulsion copolymer comprised the polymerization product of 85.0 wt. % butyl acrylate (BA) with 15 wt. % of acrylic acid AA, and had a solids content of 45.0 wt. %.

TABLE A

| Measured Tg of Polycarboxy Emulsion Copolymers | |
|---|---|
| EXAMPLE | Tg of emulsion polymer(° C.) |
| 1 | 55 |
| 2 | 15 |
| 3 | 10 |
| 4 | −38 |

Example 5

Preparation of Polyol Crosslinker (β-Hydroxyamide #1-Reaction Product of ε-Caprolactone and Diethanolamine)

To a 1 L flask equipped with a condenser, a thermocouple, and a mechanical stirrer, was added 157.5 grams (1.5 moles) of diethanolamine (DEOA). Starting at room temperature under one atmosphere of nitrogen, and without external heating, 171.2 grams (1.5 moles) of ε-caprolactone was added to the reaction flask by pipette in small aliquots over the course of 1 hour. The reaction mixture exhibited a slight exotherm to 31° C. After the addition of ε-caprolactone was complete the reaction mixture was stirred for another hour.

Examples 6-15 and Comparative Examples 16-19

Preparation of Binder Compositions

The ingredients of the binder composition were combined in the amounts shown in Table B, below. In a continuously stirred 5 liter flask, the polyol was added to the latex followed by the accelerant, and then water.

TABLE B

| | Binder Compositions | | | |
|---|---|---|---|---|
| | Polymer | | Post-Add | |
| Example | g. Emulsion Copolymer | g. Polyol | g. Accelerant | g. $H_2O$ |
| 6 | 485 of Ex. 1 | 15.7 of hydroxyamide (Ex. 5) | 8.2 SHP | 393 |
| 7 | 455 of Ex. 1 | 29.4 of hydroxyamide (Ex. 5) | 7.7 SHP | 413 |
| 8 | 475 of Ex. 1 | 22.2 of glycerol | 8.1 SHP | 394 |
| 9 | 460 of Ex. 1 | 32.3 of glycerol | 7.8 SHP | 408 |
| 10 | 465 of Ex. 1 | 43.6 of glycerol | 7.9 SHP | 440 |
| 11 | 495 of Ex. 1 | 11.1 of triethanolamine | 8.4 SHP | 386 |
| 12 | 520 of Ex. 1 | 15.2 of triethanolamine | 8.8 SHP | 416 |
| 13 | 495 of Ex. 3 | 15.6 of triethanolamine | 9.0 SHP | 449 |
| 14 | 495 of Ex. 4 | 15.8 of triethanolamine | 9.0 SHP | 449 |
| 15 | 495 of Ex. 1 | 15.8 of triethanolamine | 9.0 SHP | 449 |
| Comp. Ex. 16 | 520 of Ex. 1 | None | 8.8 SHP | 371 |
| Comp. Ex. 17 | 430 of Ex. 2 | 10.1 of triethanolamine | 7.7 SHP | 373 |
| Comp. Ex. 18 | 468.8 of Rhoplex ™ GL-618 | None | None | 431.25 |
| Comp. Ex. 19 | 347.9 of Rhoplex ™ GL-618 and 130 of QRXP-1629S | None | None | 423.13 |

NOTES:
SHP is sodium hypophosphite, added as 45% solution by weight in water.
Rhoplex GL-618 is an emulsion polymer mfgd by Rohm and Haas Company Philadelphia, PA.
QRXP-1629S is a solution polymer having SHP in the polymer backbone, mfgd by Rohm and Haas Company, Philadelphia, PA.

Preparation of Nonwoven Fiber Mat Procedure

Glass fiber nonwoven handsheets were prepared with ¾ inch K Fiber wet chop (manufactured by Owens Corning, headquartered in Toledo, Ohio), using approximately 7.6 grams of glass fiber per sheet (1.8 pounds per 100 square feet). The glass fiber was dispersed in water using NALCO 7768 polyacrylamide viscosity modifier (manufactured by Nalco Company, headquartered in Naperville, Ill.), and NALCO 01NM149 Dispersant (manufactured by Nalco Company, headquartered in Naperville, Ill.). Handsheets are formed in a Williams Standard Pulp Testing Apparatus (manufactured by Williams Apparatus Company, headquartered in Watertown, N.Y.), handsheet mold. The wet sheet was transferred to a vacuum station, where it was saturated with the inventive binder compositions (Examples 6-13), and comparative compositions (Examples 14-16) by pouring binder directly onto the wet sheet, and then de-watered by vacuum. The sheets were dried/cured in a forced air oven for 30 seconds at 210° C.

Mechanical Property Testing of Non-woven Mat

The glass fiber non-woven handsheets were cut into 1 inch by 5 inch strips for tensile testing. Dry and Hot/Wet Tensile testing was performed on seven strips from each sample using a Thwing-Albert Intellect 500 tensile tester (manufactured by Thwing-Albert Instrument Company, headquartered in West Berlin, N.J.) with a 200 lb. load cell, 1 inch/min. crosshead speed, 20% sensitivity, and a 3 inch gap. Dry tensile testing was performed on the prepared strips. Hot/Wet tensile strength testing was performed after soaking strips for 10 minutes in 85° C. water and then testing immediately after removal of the strips, while they were still wet. Hot/Dry tensile testing was performed on the prepared strips using an Instron 4201 tensile tester manufactured by Instron, headquartered in Norwood, Mass.) equipped with a 1 kN load cell and an oven chamber encasing the jaws with a temperature range capability of −100 to 400° F. (−73° C. to 204° C.). The oven chamber of the tensile tester was pre-heated to 302° F. (150° C.) prior to testing. Once pre-heated, the strips were placed in the jaws and the oven chamber was closed and equilibrated back to 302° F. (150° C.). The samples were then pulled apart at a crosshead speed of 1 inches/minute with a 3 inch gap. The results of the testing are shown in Table C.

TABLE C

Mechanical Properties Results

| Binder | Dry TS | Hot/Wet | % Ret | Hot/Dry |
|---|---|---|---|---|
| Ex. 6 | 29 | 27 | 93 | 12 |
| Ex. 7 | 28 | 27 | 96 | 10 |
| Ex. 8 | 28 | 23 | 82 | 8 |
| Ex. 9 | 30 | 26 | 87 | 9 |
| Ex. 10 | 24 | 24 | 100 | 7 |
| Ex. 11 | 29 | 27 | 93 | 12 |
| Ex. 12 | 26 | 27 | 100 | 14 |
| Ex. Comp. 16 | 28 | 20 | 71 | 8 |
| Ex. Comp. 17 | 24 | 17 | 71 | 10 |
| Ex. Comp. 18 | 28 | 21 | 75 | 6 |
| Ex. Comp. 19 | 27 | 21 | 78 | 14 |

NOTE:
All tensile values are reported in lbs/in.

Elmendorf Tear Strength Testing

Elmendorf tear strength is determined on cut samples of dried/cured handsheet which are 2.5 inches by 3 inches. A single ply sample is placed in a Thwing-Albert Tear Tester with a 1600 g. tear arm. The sample is notched with a 0.75 inch cut and the arm is released. The tear strength is recorded in grams (grams force). The results of the testing were shown in Table D.

Comparative Example 20 is a conventional urea-formaldehyde binder.

As shown in Table D, below, the tear strength of a binder composition made with a polycarboxy emulsion copolymer having a measured Tg of −20° C. in Example 14 provides improved tear strength in comparison to urea formaldehyde and polycarboxy emulsion copolymer binders of Examples 13 and 15 having higher measured Tgs. The tensile strength of a binder composition made from a polycarboxy emulsion copolymer having a measured Tg of 10° C. in Example 13, below, exhibits excellent dry tensile strength in comparison to binder compositions made in Example 14 from a polycarboxy emulsion copolymer having measured Tg of −38° C. and exhibits better tear strength and comparable other properties to the binder compositions of Example 15 made with a polycarboxy emulsion copolymer having a measured Tg of 55° C.

TABLE D

Mechanical Properties Results

| Binder Comp | Dry TS | Tear | Hot/Wet | % Ret | Hot/Dry |
|---|---|---|---|---|---|
| Ex. 13 | 33 | 862 | 24 | 73 | 13 |
| Ex. 14 | 13 | 1262 | 7 | 55 | 7 |
| Ex. 15 | 31 | 820 | 31 | 99 | 13 |
| Ex. Comp. 20 | 33 | 513 | 23 | 67 | 30 |

We claim:

1. An article comprising:
   a flexible material of a non-woven, the flexible material treated with a binder composition of
   (a) one or more polycarboxy emulsion copolymer polymerized from 10 wt. % to 25 wt. % of a carboxy acid monomer, based on the total weight of monomers in the copolymer, wherein the polycarboxy emulsion copolymer has a measured Tg of from −45° C. to 25° C., and a total solids of no less than 40 wt. %; and,
   (b) at least one polyol crosslinker having a molecular weight of less than 700, the polyol crosslinker comprising a primary hydroxy group and at least one additional hydroxy group, wherein the ratio of primary hydroxy group equivalents to carboxy group equivalents is from 0.25:1 to 2.0:1,
   wherein, the flexible material is selected from (i) a facing sheet chosen from a fibrous sheet, roving, mat or a pultruded fibrous material in a gypsum wallboard or panel comprising a gypsum core layer sandwiched between facing sheets and (ii) a sheet, roving or mat which is a carpet backing.

2. The article as claimed in claim 1, wherein the polycarboxy emulsion copolymer in the binder composition has a measured Tg of from 0° C. to 25° C.

3. The article as claimed in claim 2, wherein the polycarboxy emulsion copolymer in the binder composition comprises a pre-crosslinked polycarboxy emulsion copolymer.

4. The article as claimed in claim 1 which comprises as the flexible material (i) the facing sheet in a gypsum wallboard or panel, wherein the gypsum core layer is sandwiched between two flexible material facing sheets, each flexible material facing sheet treated with the binder composition.

5. The article as claimed in claim 1, wherein the flexible material of a non-woven which comprises fiber selected from glass fibers, polyester fibers, rayon fibers, nylon fibers, superabsorbent fibers, renewable fibers, and mineral wool fibers.

6. The article as claimed in claim 1, wherein the polycarboxy emulsion copolymer in the binder composition comprises a pre-crosslinked polycarboxy emulsion copolymer.

7. The article as claimed in claim 1 which is free from added formaldehyde, and which does not liberate formaldehyde as a result of drying and/or curing.

8. A process of making a flexible non-woven fiber article comprising i) pultruding two or more non-woven fibers or a fiber roving with a binder composition comprising (a) one or more polycarboxy emulsion copolymer polymerized from 10 wt. % to 25 wt. % of a carboxy acid monomer, based on the total weight of monomers in the copolymer, wherein the polycarboxy emulsion copolymer has a measured Tg of from −45° C. to 25° C., and a total solids of no less than 40 wt. %; and,
   (b) at least one polyol crosslinker having a molecular weight of less than 700, the polyol crosslinker comprising a primary hydroxy group and at least one additional hydroxy group, wherein the ratio of primary hydroxy group equivalents to carboxy group equivalents is from 0.25:1 to 2.0:1,
and ii) drying to cure the binder composition.

* * * * *